US006530451B2

(12) United States Patent
Noselli

(10) Patent No.: US 6,530,451 B2
(45) Date of Patent: Mar. 11, 2003

(54) SYSTEM OF ELEMENTS FOR THE DIFFUSION OF SOUND IN ROOMS DELIGATED TO THE REPRODUCTION OF MUSIC AND SPEECH

(75) Inventor: Guido Noselli, Flero (IT)

(73) Assignee: Outline S.N.C. di Noselli G. & C. (IT)

( * ) Notice: Subject to any disclaimer, the term of this patent is extended or adjusted under 35 U.S.C. 154(b) by 111 days.

(21) Appl. No.: 09/812,927

(22) Filed: Mar. 20, 2001

(65) Prior Publication Data

US 2001/0023792 A1 Sep. 27, 2001

(30) Foreign Application Priority Data

Mar. 21, 2000 (IT) ........................................ BS00A0027
Mar. 21, 2000 (IT) ........................................ BS00A0026

(51) Int. Cl.[7] ................................................ G01K 11/00
(52) U.S. Cl. .......................... 181/179; 181/177; 181/30
(58) Field of Search ................................ 181/179, 177, 181/30, 152, 159, 180, 182; 381/340, 339

(56) References Cited

U.S. PATENT DOCUMENTS 1,923,066 A * 8/1933 Cordes ........................ 181/30
1,975,604 A * 10/1934 Hanson ........................ 181/30
3,316,999 A * 5/1967 Jaffe et al. ..................... 181/30
3,621,934 A * 11/1971 Thrasher et al. ............ 181/290
4,366,882 A * 1/1983 Parker .......................... 181/30
4,605,088 A * 8/1986 Sickels ........................ 181/30
5,125,732 A * 6/1992 Jacobson et al. .............. 352/1
5,525,765 A * 6/1996 Freiheit ....................... 181/30
5,637,840 A * 6/1997 Kim ........................... 181/152
5,804,774 A * 9/1998 Ford et al. .................. 181/152
6,446,751 B1 * 9/2002 Ahuja et al. .................. 181/30

* cited by examiner

*Primary Examiner*—Robert E. Nappi
*Assistant Examiner*—Edgavdo San Martin
(74) *Attorney, Agent, or Firm*—McGlew and Tuttle, P.C.

(57) ABSTRACT

A system for sound diffusion, particularly at low and infra-low frequencies in rooms used for the reproduction of music and speech including at least one large horn enclosure and an architectural structure with a continuous or intermittent "multi-hemicylindrical" surface. The surface covers the walls of the room, for the diffusion/reflection of the sound in a broad spectrum of frequencies and with absorption that is adjustable at least at the low frequencies.

20 Claims, 9 Drawing Sheets

SYSTEM OF ELEMENTS FOR THE DIFFUSION OF SOUND IN ROOMS DELIGATED TO THE REPRODUCTION OF MUSIC AND SPEECH

FIELD OF THE INVENTION

The present invention regards a system of components for the diffuision of sound, which is particularly suitable for permanent or semipermanent installations in venues dedicated to the production or reproduction of music, speech, sounds or vibrations, outdoors, in cinemas, auditoriums and in all indoor rooms in general.

BACKGROUND OF THE INVENTIONS

New digital technology in the sound recording field has made it possible to record part of the sound spectrum with absolute fidelity, such as the low and especially infra-low frequencies, those below the levels which are audible by the human ear and are perceptible by the body as vibrations.

This technology is also characterized by the absence of distortion of the original wave shape at a much higher sound level than was and is possible with analog systems. Particularly, in analog systems adding to the pickup problems Insurmountable mechanical and electromagnetic limits which are found during the storage or recording phase of the program on magnetic tape or vinyl records, it is absolutely impossible to exceed a certain level of dynamics, especially in the frequency bands in question, and to contain the distortion and therefore the degradation of the original signal within negligible limits.

In short, present digital systems enable the recording and the reproduction of a much wider dynamic range than is usually audible or necessary for the sensitivity of the human ear, maintaining great fidelity with features of low distortion and useful passband.

However, although this possibility is now widely accepted during recording and future development is looking to record further infinitesimal qualitative details, the possibility of reproducing the dynamic range by means of a modem amplification system is not as widely achieved.

In fact, in spite of the extensive technical/scientific literature on the subject, I'm not aware of any product capable of reproducing such a dynamic range, at least as far as the low or infra-low frequencies are concerned, which are the most difficult to reproduce in terms of power. This hoped for result is often unachievable due to environmental acoustics, which too often are not up to the reproduction system'standard, or at any rate don't allow the original sound quality to be fully respected.

It must not be forgotten that for the sensitivity curve of the human ear, the difference between the loudness level at the center of the audible band (e.g. taking a value of 90 dBSPL and 1,000 Hz) and the level necessary for the same loudness at the bottom end of the audible band, 20 Hz is no less than 30 dB SPL.

Now since 30 dB (logarithmic measurement unit) are equivalent to 1,000 times in power, this means that when 1 Watt of power is applied to its terminals, a given loudspeaker is capable of reaching (for example) a level of 90 dBSPL at 1,000 Hz; to obtain the same loudness at 20 Hz, it's necessary to use another loudspeaker with the same efficiency at the latter frequency as that of the former loudspeaker at 1,000 Hz, as well as a power capacity and mechanical construction able to support no less than 1,000 Watts applied to its terminals.

Although material and adhesive technology has now enabled the construction of loudspeakers with voice coils capable of supporting 1,000 electric Watts even for long periods without burning out, thanks also to ingenious cooling systems, this in fact occurs at relatively high frequencies, up to the transducer's maximum effidency zone, usually at frequencies of between 100 and 200 Hz; however, this same technology definitely does not make this practice possible at gradually lower frequencies, even from 100 Hz: the entire loudspeaker is mechanically destroyed in a very short, regardless of the capacity of the voice coil to hold power without burning out.

This occurs because a loudspeaker's diaphragm movement, necessary for the reproduction of low and infra-low frequencies at a high sound pressure levels, is almost always incompatible with its own intrinsic geometry or mechanical construction.

Moreover, even overlooking the fact that any loudspeaker which is capable of holding a sound signal applied to its input terminals with a power of 1,000 Watts would reproduce this signal with such a high distortion that no ear could bear i for a significant time, a larger quantity of loudspeakers, in a ratio of at least 1 to 10 or higher, according to the radiation conditions under which these units would have to operate, would have to be used to compensate for this enormous difference in efficiency, which is typical of woofers when reproducing low frequencies rather that those in the central band.

The premise is so generalized that it is possible to see with increasing regularity sound reinforcement systems using a section for the reproduction of low and infra-low frequencies composed of a large number (even ten) single high-power units linked together.

This is because of the need to obtain high sound levels which are distortion-free or almost when reproducing music, nowadays routine practice in all the types of related events; dubs, live concerts or even classical music reproduced live in stadiums for thousands of listeners, with the digital amplification of a large symphonic orchestra, or even modem films' soundtracks which, thanks to digital recording, are able to recreate the sound's level and quality in a captivatingly realistic manner.

All this obviously leads to a significant rise in costs and consumption due to the use of a large amount of electricity for powering numerous units together, as well as a rise in maintenance costs because of the greater possibility of repair work.

However, realistic high-level sound reproduction even for low and infra-low frequencies isn't the only problem that prevents the intrinsic quality of modem sound production and/or recording techniques from being achieved.

In fact, rooms delegated mainly to the reproduction of music and speech (e.g. movie theaters, projection rooms, etc.) very often have architectural characteristics which considerably change the original sound played back inside them, even more so if levels must be kept high for the degree of realism required.

Walls that are parallel and often reflective, lack of homogeneous, well-distributed absorption for achieving optimal reverberation times for the venue and the type of program being reproduced lead to the concentration of greater energy on some frequency bands rather than others in certain positions in the room, according to the studies and statistics that have stood the test of time for decades.

In relatively small rooms, it's even possible that so-called well-known stationary waves occur at low frequencies, greatly altering reproduction quality, masking medium and high frequency bands, whose intelligibility is indispensable to enable speech to be understood when there is an often extremely complex music program.

Generally speaking, rooms built in the past, but also nowadays, for the reproduction of the film soundtracks (e.g. movie theaters), often for budget reasons, have classical parallelepiped layouts with parallel walls, regardless of the fact that there are also the so-called "balconies", even if these are less frequently built for cost reasons.

Moreover, apart from the necessary insulation towards the outside, internal acoustic treatment which should be very accurate to obtain the required reverberation curve according to the hall's frequency and dimensions, is generally limited to the ceiling and (for reasons Intrinsic to the function) to the area of the floor on which the audience's fabric-covered seating is installed.

Walls are rarely suitably well treated. "Flutter" echoes, "slap" echoes, unwanted reflections and stationary low-frequency waves often considerably worsen reproduction of soundtracks and speech in theaters screening films.

SUMMARY AND AIMS OF THE INVENTION

A first aim of the present invention is to overcome and solve the aforementioned problems regarding reproduction of low and infra-low frequencies, using an enclosure purposely designed and constructed for installation in rooms in which it's often or always necessary to have a section available for the reproduction of low and infra-low frequencies able to give a sound level suited to the dimensions of the room in question and the events taking place in it.

A second aim of the invention is to solve the above-mentioned problems of the diffusion of sound in walled environments in a simple economic manner, particularly in the case of new or renovated buildings, based on the assumption that a particular design regarding a specific room is not necessary, but it's sufficient to use modular architectural elements which are practical from an acoustic point of view and can be adapted from a structural point of view to any room, regardless of its specific pre-existent or new architecture.

These aims are achieved, according to the invention, using a sound diffusion system including, in combination or separately, at least one large cost-effective horn made of brickwork using traditional methods or prefabricated cement elements, assembled on-site in the foreseen position, and an architectural structure with a continuous or internittent "multi-henicylindrical" surface covering the room's walls, for the diffusion/reflection of the sound in wide spectrum of frequencies and at the same time for adjustable absorption of low and infra-low frequencies.

This large horn should preferably be located at the point in which the stage is installed in certain rooms, so that the upper covering of horn can be used as the stage surface, or at least the surface on which the stage is built.

The horn will be designed and built with parallel upper and lower walls, which will thus be load-bearing, able to support any weight on the top. The side walls will be curved (which can also be built using numerous straight sections) due to the need to comply with the necessary expansion of the horn area, provided for at the design stage and carefully calculated for the correct operation of this type of unit (i.e. the horn) as an acoustic load for a "woofer" loudspeaker, particularly if dedicated to accurate reproduction of low and infra-low frequencies.

The horn's dimensions will be calculated, according to usable space, preferably (but not exclusively) to obtain, at the highest sound level possible from the loudspeakers or drivers, reproduction of low and ultra-low frequencies, starting at 200 Hz and going down to below or even under 20 Hz. This is the case when the sound being played back requires the reproduction of actual vibrations, perceptible to the body rather than the ear and necessary, for example, with the highly realistic recording of soundtracks involving natural phenomena, such as earthquakes, tidal waves, volcanoes or other explosions, often indispensable effects' in recently produced films.

Even if the horn has the apparent drawback of not being able to be removed, due to the structural features described, in reality it offers absolutely the best solution to requirements connected with the reproduction of the low and infra-low frequencies, from the point of view of cost, performance and consumption.

Another structural detail not to be overlooked is the design of the system that drives the horn(s), in a section, which is separate from the horn and can be easily and securely fitted to it when required.

In other words, the loudspeaker or loudspeakers, which constitute the "powerhouse" of the system, will be housed in a dedicated "container" with the volume required to produce the necessary rear load that these loudspeakers require for driving the horn correctly: this compact "container" will be easily transported, thanks to its base's built-in wheels.

As well as facilitating maintenance work, this solution solves any problem of system elements susceptible to damage being exposed to bad weather, vandalism or simply damage, in fact reducing, especially in the case of outdoor use, the decline in performance of the active elements (the loudspeakers), which will thus only be subject to wear due to their actual operation.

Another considerable advantage is due to the fact that travelling or touring shows, on which use is made of large amplification systems and therefore the appropriate number of cumbersome subwoofers, can use permanent local systems, with great savings from the point of view of transport (including that of the amplifiers) and energy consumed, while maintaining the reproduction quality of the low and infra-low frequency parts of the program.

Moreover, the horn system is directive in terms of width even at low frequencies, very advantageous for reducing undesired pollutant sound spill, unequalled by more expensive traditional systems, as they are necessarily constructed with dimensions suited to transport and therefore each individual unit is compact.

Moreover, from the point of view of performance, combining multiple units is only useful in the case of dimensions that are certainly much smaller than those in which the horn described can be constructed without any problem of interference.

In fact, whereas so many enclosures placed side by side to form a dimension greater than that of the wavelength of the frequency reproduced cause considerable harmful modifications in the polar response, due to interference and vibrations, although having large dimensions compared to the wavelengths of the band of frequencies reproduced, the horn according to the present invention behaves like one large source free from any interference or vibration capable of seriously deteriorating the program reproduced.

The architectural structure consists of a series of modules or panels having a hemicylindrical surface, which are equal or different in terms of chord and radius of curvature, constituting a "multi-hemicylindrical" surface for covering the walls of a room, characterized by a lack of flat or concave surfaces. This may be run through by openings or holes with a width that can be modified or varied as required during construction.

This enables to obtain the desired diffusion of the entire spectrum of frequencies required in a foreseeable manner, because it is closely related to the dimension of the “hemicylindrical” elements and the distance between them and between them and the wall, according to procedures that are well known in acoustics, and at the same time to obtain low frequency acoustic absorption which is adjustable, thanks to the possibility of dosing the holes or openings in the said “hemicylindrical” elements successively and empirically, after their installation in the room.

The results of using these architectural elements lies in the advantageous contribution of the room to the reproduction of wide-band sound with even spatial distribution throughout the entire “audience” which has (without appreciable differences in level or quality between zones) greater presence and thus maximum sound spectacularity, without the typical limitations of traditional rooms.

The attached drawings illustrate in a non-limiting manner some possible embodiments of the present invention of a horn-type diffuser designed for a rapid connection of the active driver part to its throat and having an architectural structure for the covering of walls.

The various innovative features that characterise the invention are pointed out in detail in the claims annexed to and forming a part of this disclosure. For a better understanding of the invention, its operating advantages and specific aims attained by its uses, reference is made to the accompanying drawings and descriptive matter in which preferred embodiments of the invention are illustrated.

DESCRIPTION OF THE PREFERRED EMBODIMENTS

Figure 1:
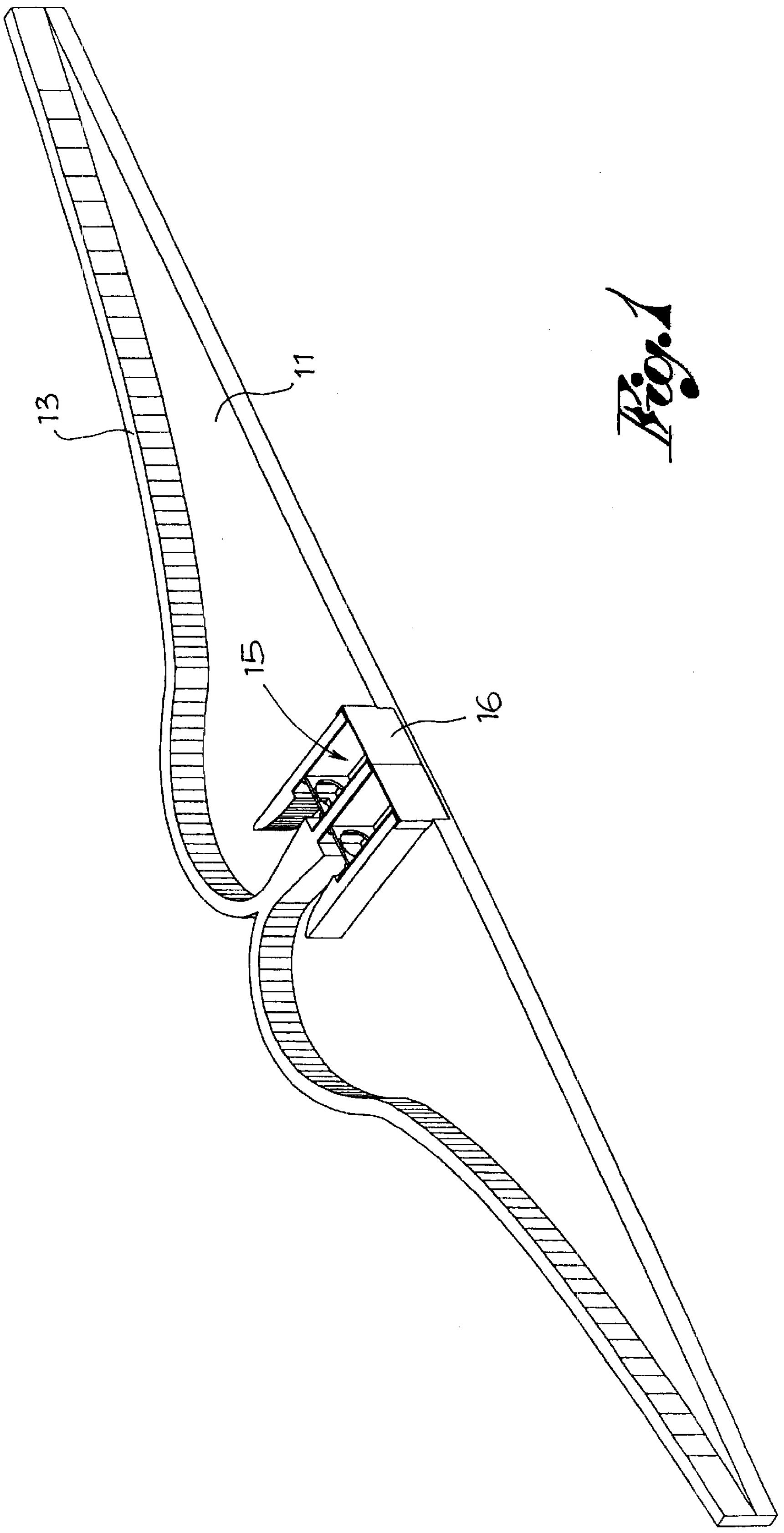
FIG. 1 is a perspective view showing a configuration of the horn without the top wall.
Figure 2:
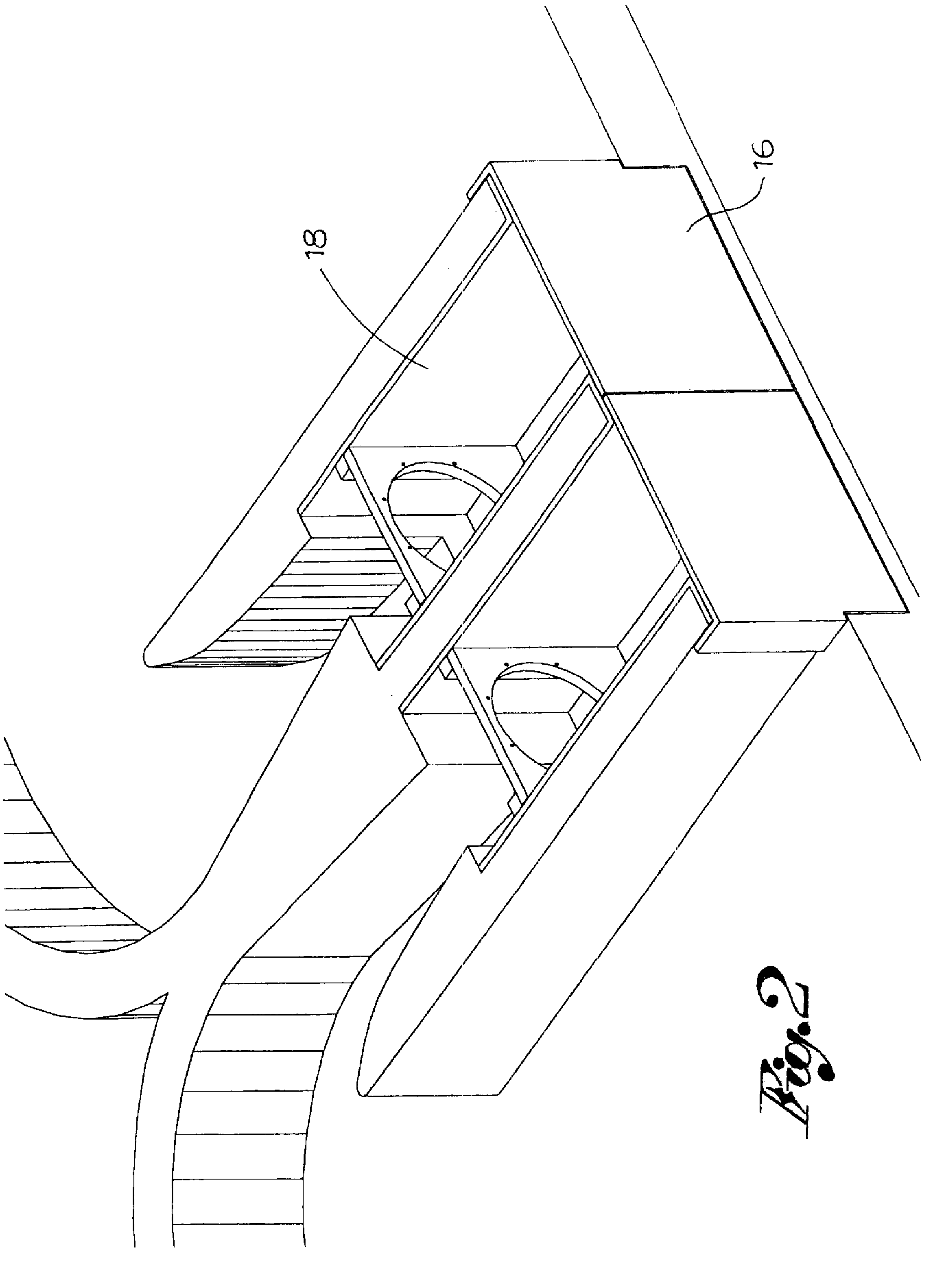
FIG. 2 is an enlarged perspective view of a part of the horn dose to the driver unit.
Figure 3:
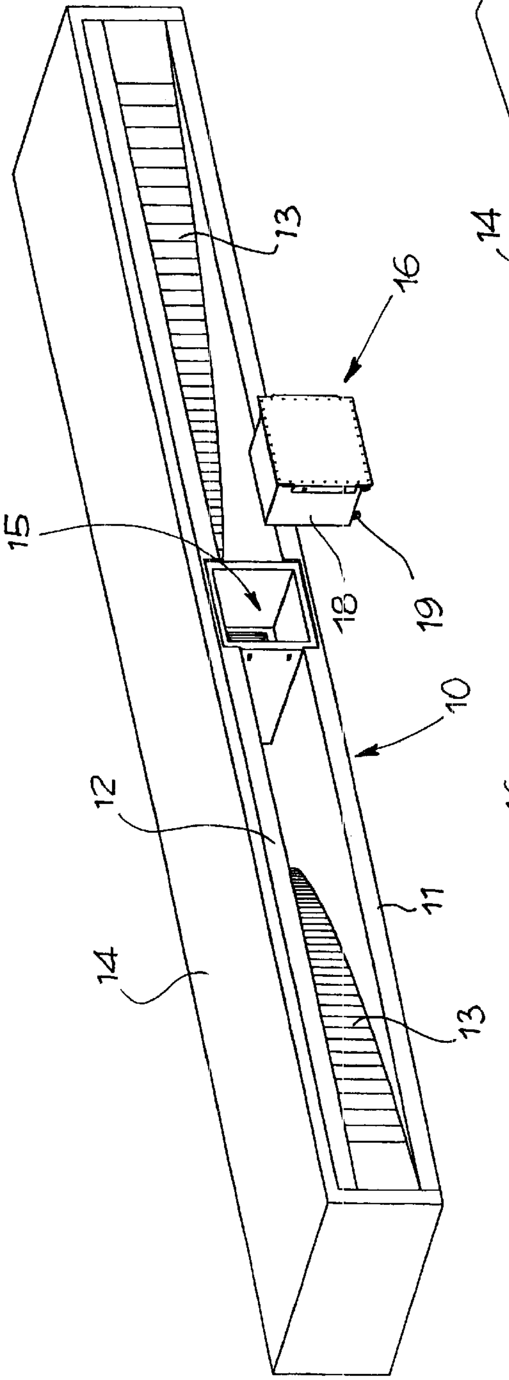
FIG. 3 is a perspective view of an example of a finished horn with the driver unit removed.

Referring to the drawings in particular, FIGS. 1–4 show a speaker enclosure in the form of a large horn 10 defined by a lower wall 11 and an upper wall 12 which are horizontal and parallel, and curved side walls 13, which are dimensioned and follow a line dependent on the expansion of the areas required for the correct operation of the horn itself.

All the parts may be produced on site in brickwork o with the use of prefabricated elements. The upper wall 12 of the horn may itself constitute a surface that can be walked on. As an alternative, this upper wall may be overhung by a support cover 14, represented by or forming the floor of a stage.

The curved walls 13 of the horn extend outwards away from a space 15 of suitable volume, in which a driver unit 16 is housed. This unit comprises one or more loudspeakers 17, which are arranged in a cabinet 18 fitted with wheels 19. The driver unit 16 can thus be moved in the manner of a trolley to be easily inserted into the dedicated space 15 and be easily removed and transferred as required.

Figure 4:
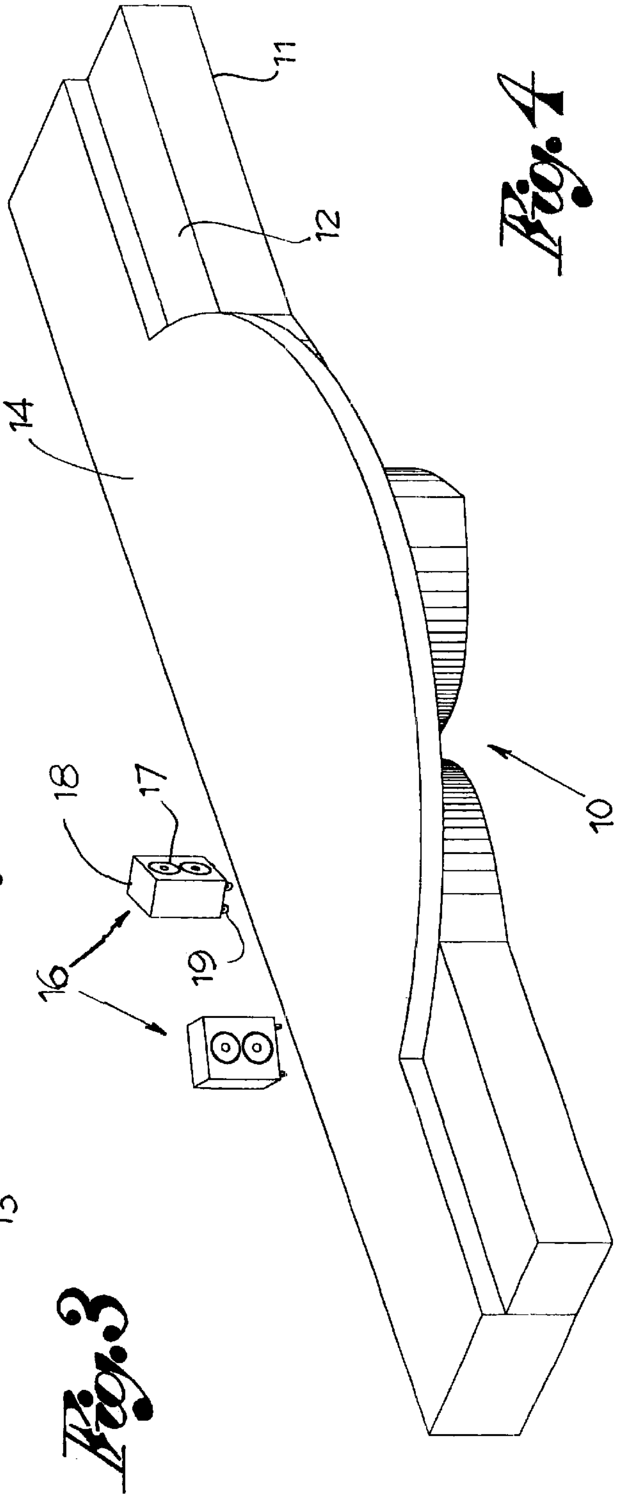
FIG. 4 is a perspective view of the horn-type enclosure in another configuration example with two separate ducts forming two adjacent horns.
Figure 4A:
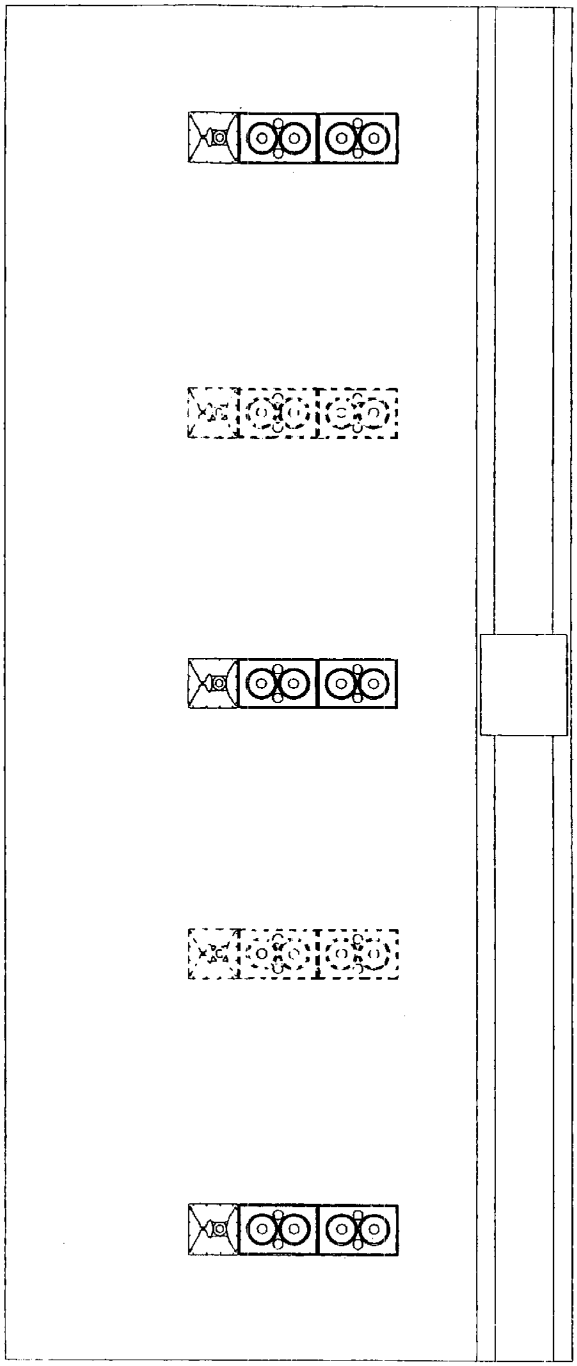
FIG. 4*a* is a schematic view of an arrangement with a screen with a horn-type enclosure at the base and screen loudspeaker systems for the 3 or 5 main channels.
Figure 4B:
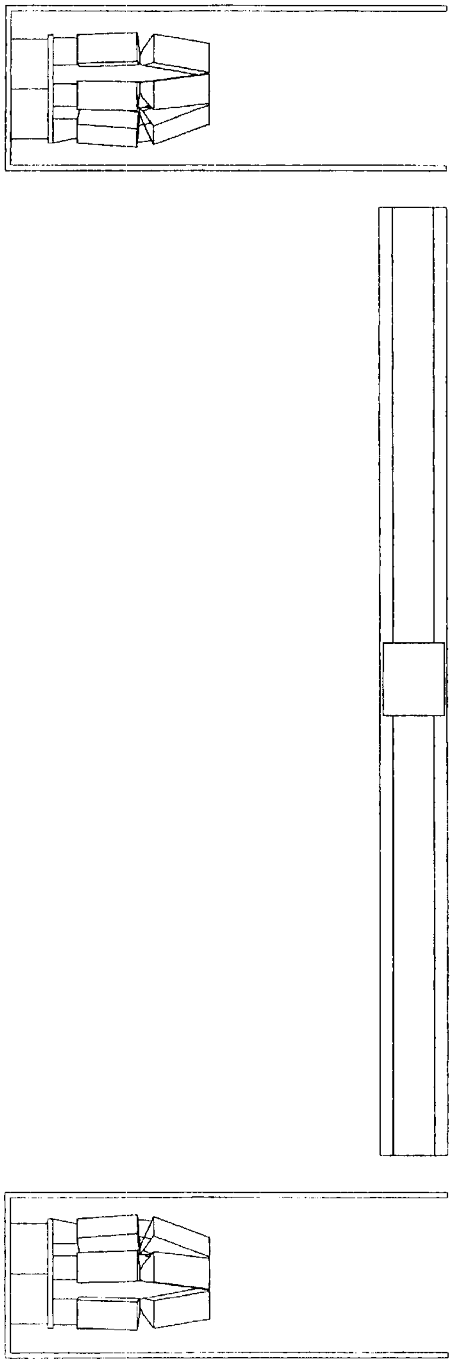
FIG. 4*b* is a front view showing the horn, whose upper wall forms the surface of a stage floor (e.g. for concerts) and which functions as a subwoofer in the sound reinforcement system which is installed at either side.
Figure 5:
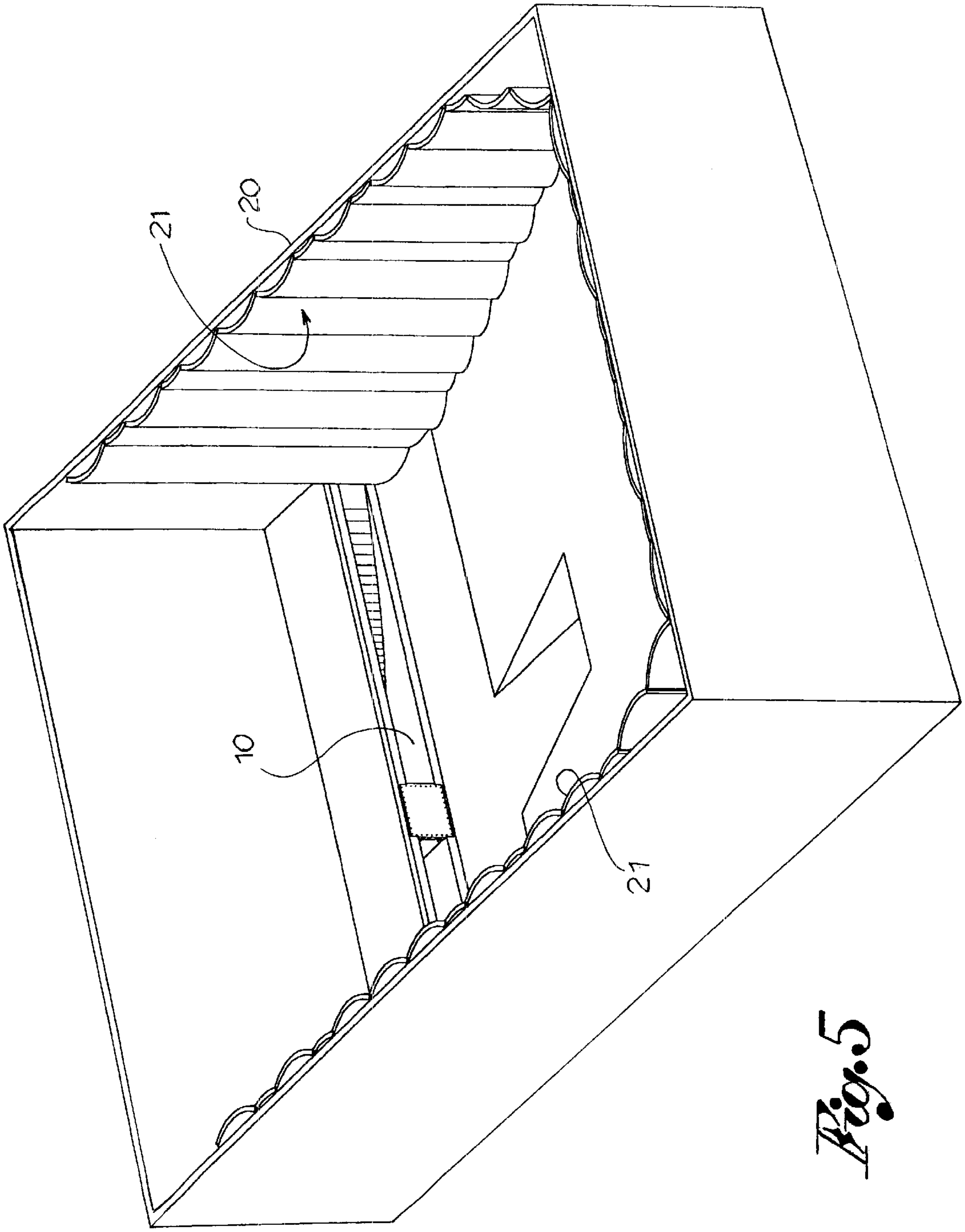
FIG. 5 is a schematic axonometric view of the interior of a room complete with a structure for the diffusion/reflection/absorption of sound.

The horn 10 may be built for example at the base of a screen in a room used for the reproduction of music and speech, as is schematically shown in FIGS. 4 and 5, or of a concert stage (FIG. 4*b*) in combination with complete, low, medium, high and screen loudspeaker systems, respectively. The walls 20 of such a room may be covered, according to the present invention, with a diffusing/reflecting/absorbing structure 21, which consists of basic modules or panels 22, in a large variety of shapes and materials. The structure 21 may therefore be made of bricks, may consist in prefabricated modules or even wood panels or wood modules and may be applied to walls made of brickwork or reinforced concrete.

Figure 6:
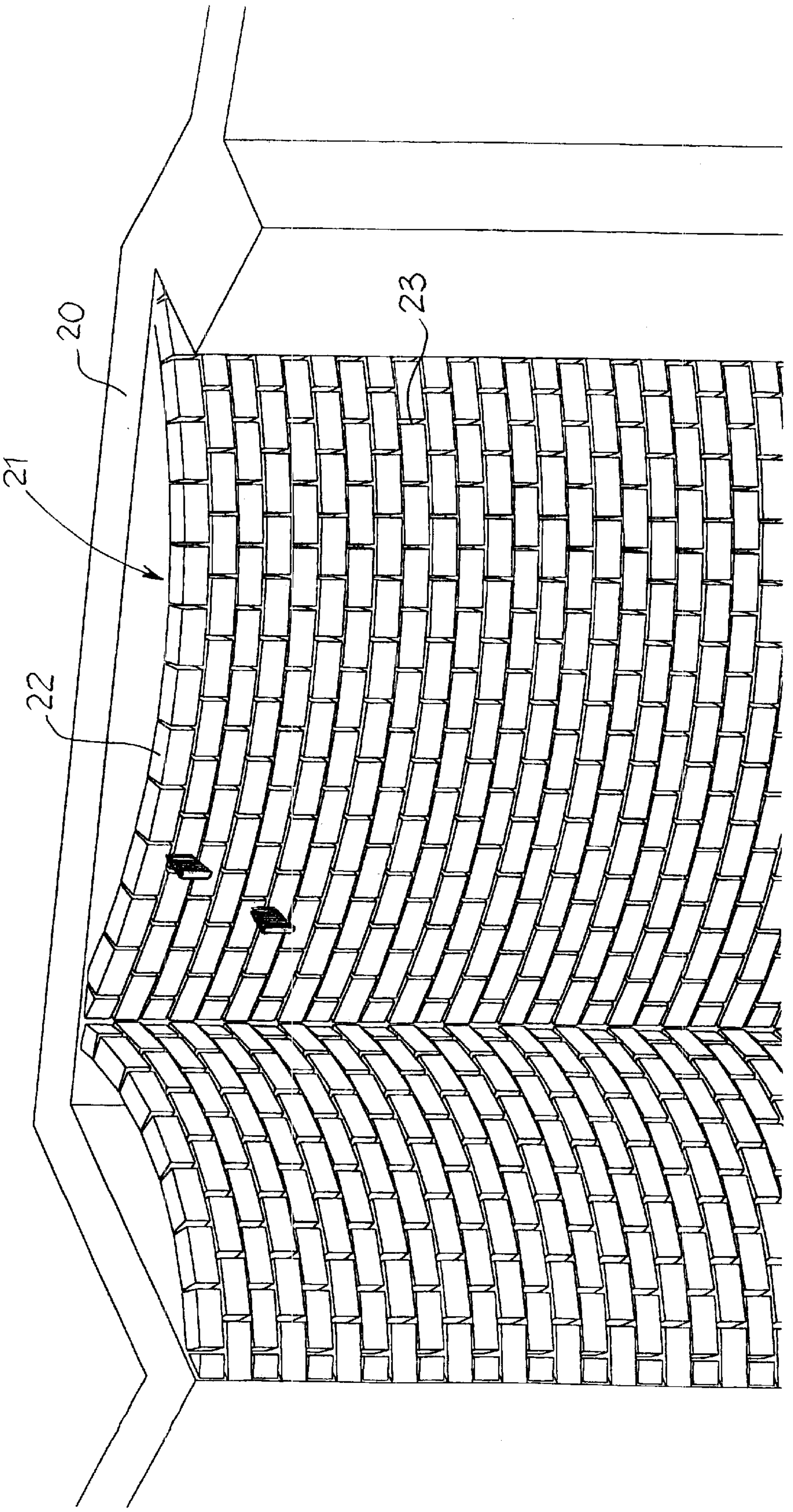
FIG. 6 is a perspective view showing an exemplary embodiment of the architectural structure without rear absorbent material.
Figure 7:
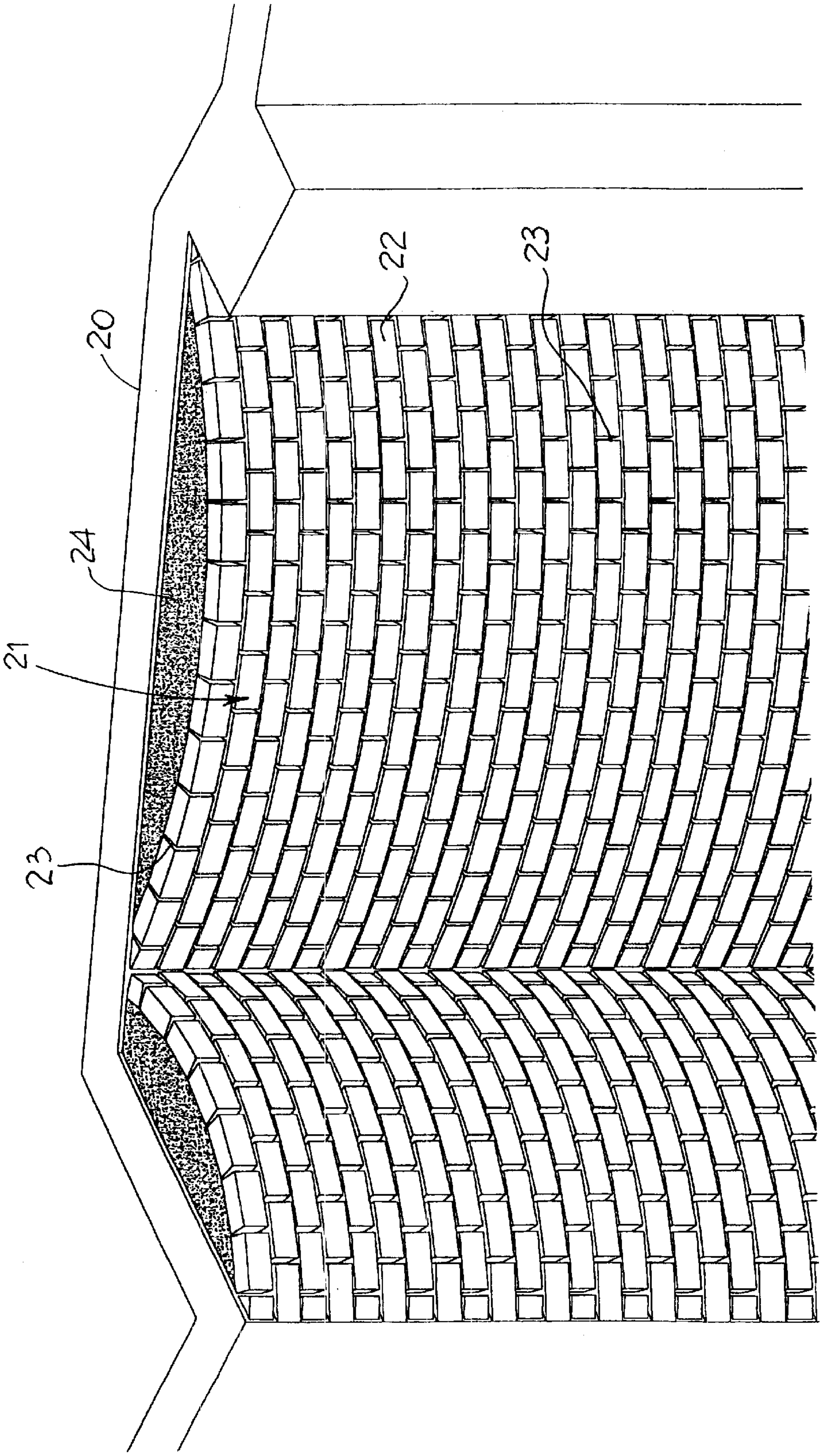
FIG. 7 is a perspective view showing the exemplary embodiment of the architectural structure of FIG. 6 with rear absorbent material.

FIGS. 6 and 7 show a structure wherein the component modules 22 are spaced at a distance from one another, leaving an opening 23 between adjacent modules or groups of modules.

The structure 21 may be installed dose to the walls 20, forming cavities between themselves and the walls that may or may not be filled with absorbent material 24 such as mineral wool or the like.

Figure 8:
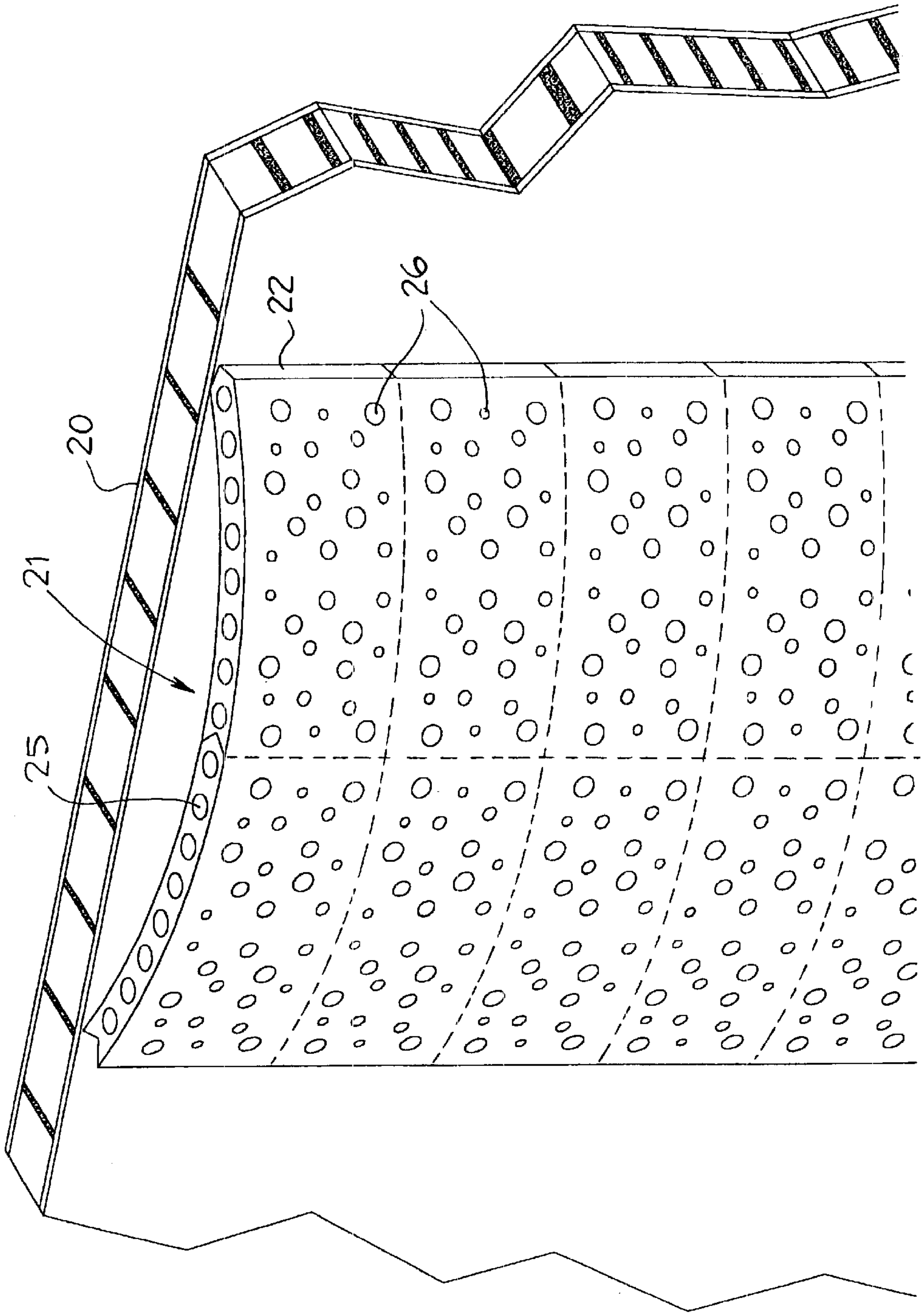
FIG. 8 is a perspective view showing another exemplary embodiment of the architectural structure also without absorbent material.
Figure 9:
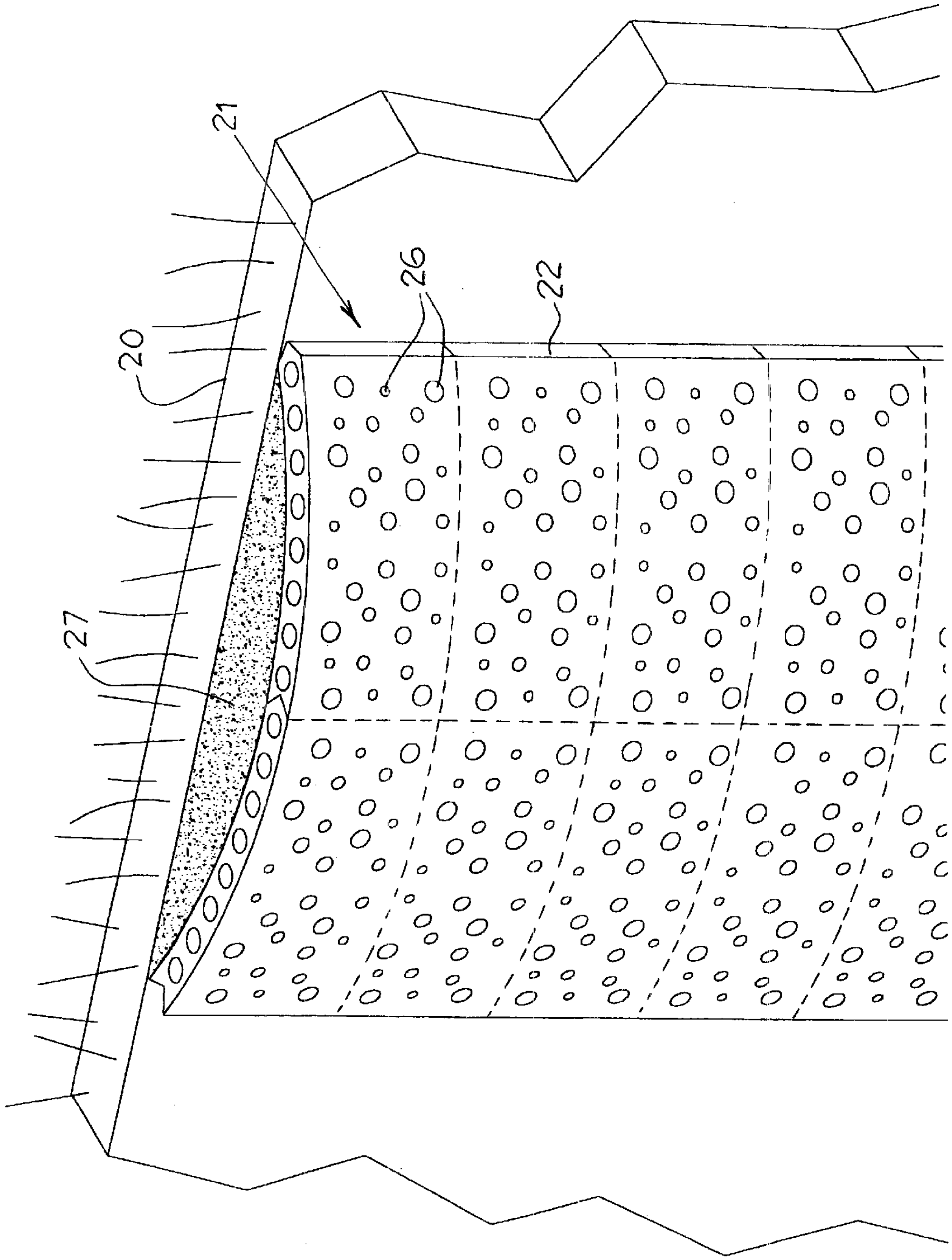
FIG. 9 is a perspective view showing the exemplary embodiment of the architectural structure of FIG. 8 with absorbent material.

FIGS. 8 and 9 show a structure 21, made up of modules which are provided with longitudinal 25 and/or transverse 26 holes which can have different diameters, as required. Even in this case, cavities, which may or may not be filled with acoustic absorbent material 27, may be formed between the elements of the structure 21 and the walls 20 against which they are installed.

Since it is not always possible to know the acoustic features of rooms to be restructured before the actual work is done, or of those still to be constructed, the architectural structure proposed here is designed to act on a broad acoustic spectrum as a highly effective diffuser which is capable of reflecting the incident sound energy and restoring it, not as powerful harmful reflections (typical of flat or concave surfaces) but splitting the energy into countless other low intensity and low energy reflections, positively decisive for better sound diffusion, regardless of the reverberation time or even of the echo that the room might have.

Moreover, this structure may be constructed of dimensions appropriate for diffusing sound, beginning at the frequencies for which such diffusion becomes highly useful, from 200 Hz upwards for example. The structure may has the peculiarity, obtained without any increase in cost or construction time, of incorporating a large number of Helmholtz resonators, which can be selectively tuned in frequency with a simple effective method. Such resonators may easily be converted into broadband Helmholtz resonators with a suitable use of economic materials, such as mineral wool.

Because of its original structural features, once these multiple resonators have been obtained and selectively tuned to the multiple different low frequencies or to a broadband absorption efficacy, the structure can easily be varied. A great freedom of action in relation to the same low frequencies is provided for which this is considered to be necessary, by means of the simple closure of the tuning openings 23, 26 of the resonators proper, e.g. by injecting normal expanded polystyrene or any material used for sealing in construction work.

The device, system and method of the invention makes it possible to obtain from the same architectural element a suitable combination of two opposed acoustic effects, such as absorption and diffusion, which is a necessary condition for obtaining a low reverberation time, as is best for speech, and at the same time also excellent diffusion of music, as usually occurs with a higher reverberation time.

Another peculiar feature of the proposed structure lies in the superior insulation towards the outside, when combined with a traditional insulating wall on the side of the cavities, which are or are not filled with mineral wool.

It should also be noted that the construction of the structure described can be carried out with a large variety of basic elements both in terms of shape and highly different materials, provided they have the necessary density, enabling room designers to obtain original aesthetic features which are different from room to room and architecturally valid. It's therefore possible to use the most economic bricks, mass-produced prefabricated parts or even wood.

Therefore, according to the present invention, each structure in which the functions of broad bandwidth diffuser and of low-frequency selective absorber are found, is a complete, economic, effective and easily adaptable solution, even after installation, to all the acoustic problems that afflict many rooms in which it's necessary to obtain intelligible speech and good music reproduction simultaneously.

While specific embodiments of the invention have been shown and described in detail to illustrate the application of the principles of the invention, it will be understood that the invention may be embodied otherwise without departing from such principles.

What is claimed is:

1. A sound diffusion system, comprising:

a large horn unit made from brickwork and prefabricated cement elements assembled on-site, and an architectural structure with a continuous or intermittent multi-hemicylindrical surface covering the walls of a room, for a diffusion/reflection of the sound in a broad band of frequencies and with adjustable absorption at least at low frequencies.

2. A sound diffusion system in accordance with claim 1, wherein said large horn unit is permanently set up in the room for reproducing low and infra-low frequencies and includes a removable driver unit connected to said horn.

3. A sound diffusion system in accordance with claim 2, wherein the said horn part is made up of a horizontal bottom wall, a parallel horizontal top wall and curved side walls, which extend between said horizontal parallel walls, and open out with a curved diverging course away from a space containing said driver unit.

4. A sound diffusion system in accordance with claim 3, wherein said horizontal parallel walls and said curved walls are built in brickwork or prefabricated elements, an upper covering forming a surface which can be walked on or having a covering which forms a surface which can be walked on.

5. A sound diffusion system in accordance with claim 2, wherein the said driver unit comprises one or more loudspeakers installed in a movable cabinet fitted with wheels.

6. A sound diffusion system in accordance with claim 1, wherein said architectural structure consists in modules or panels close to the walls of the room, said modules being made from bricks, prefabricated brick or wood components and assembled in a complementary manner.

7. A sound diffusion system in accordance with claim 1, wherein said architectural structure includes modules or panels placed against the walls of the room.

8. A sound diffusion system in accordance with claim 6, wherein said modules or panels incorporate multiple Helmholtz resonators in parallel, whose frequency can be tuned as required or which can be converted into wide-band resonators.

9. A sound diffusion system in accordance with claim 6, wherein said architectural structure has openings that can be selectively closed to vary the amount of absorption.

10. A sound diffusion system in accordance with claim 7, wherein said architectural structure has openings that can be selectively closed to vary the amount of absorption.

11. A sound diffusion system in accordance with claim 8, wherein said openings are provided between adjacent modules or panels or between groups of modules of panels.

12. A sound diffusion structure in accordance with claim 9, wherein said openings are defined by holes formed in each module or panel: these holes can have the same or different diameter and be closed as required.

13. A sound diffusion structure in accordance with claim 6, wherein an acoustic absorption/absorbent material can be inserted between the modules or panels and the walls which they are dose to.

14. A sound diffusion system, comprising:

a low and infra-low frequency horn unit part made from structural elements assembled at a space; and an architectural structure with a continuous or intermittent hemicylindrical surface facing said horn, said surface forming a space wall, said horn extending substantially between sides of said hemicylindrical surface, said hemicylindrical surface diffusing and/or reflecting sound in a wide spectrum of frequencies and with adjustable absorption of low frequencies.

15. A sound diffusion system in accordance with claim 14, wherein a large horn enclosure is permanently set up in the room for reproducing low and infra-low frequencies and comprises a removable driver unit connected to said horn unit, said driver unit including one or more loudspeakers and said horn unit comprises a horizontal bottom wall a parallel horizontal top wall and curved lateral walls, said curved lateral walls extending between said horizontal parallel walls, and expanding with an outward curve away from a space for accommodating said driver unit.

16. A sound diffusion system in accordance with claim 15, wherein said architectural structure includes modules or panels installed close to the walls of the room.

17. A sound diffusion system in accordance with claim 16, wherein said modules or panels incorporate multiple Helmholtz resonators in parallel, whose frequency can be tuned as required or which can be converted into wide-band resonators.

18. A method of providing a sound diffusion system, consisting in the following steps:

providing a low and infra-low frequency horn unit including assembling a horn part from brickwork, concrete elements or structural elements at a theater space; and forming an architectural structure with a continuous or intermittent hemicylindrical surface, facing the horn, covering the theater wall, the horn extending between sides of said hemicylindrical surface and facing a central portion of the hemicylindrical surface, said henicylindrical surface diffusing or reflecting sound in a wide spectrum of frequencies and with adjustable absorption of low frequencies.

19. A method in accordance with claim 18, wherein a large horn enclosure is permanently set up in the room for reproducing low and infra-low frequencies and comprises a removable driver connected to said horn unit, said driver unit including one or more loudspeakers and said horn part comprising a horizontal lower wall, a parallel horizontal upper wall and curved side walls, said curved side walls between said horizontal parallel walls, and expanding with a curved and diverging course from a space for accommodating said driver unit, wherein said architectural structure includes modules or panels installed against the walls of the room.

20. A sound diffusion system in accordance with claim 16, further comprising:

incorporating multiple Helmholtz resonators, in parallel in said modules or panels and selectively tuning the frequency of the resonators or converting the resonators to wide-band resonators.

* * * * *